UNITED STATES PATENT OFFICE.

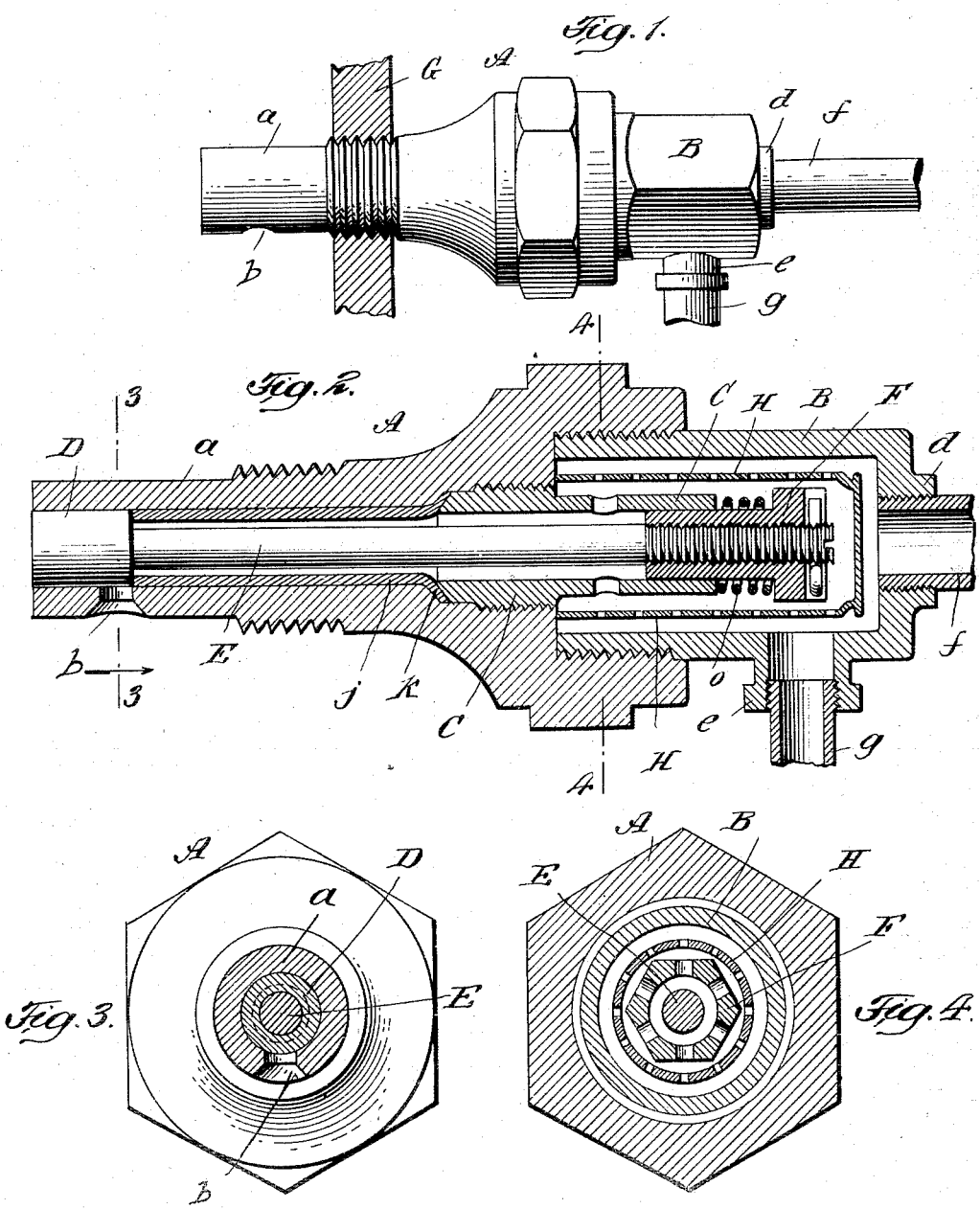

CHARLES S. BAVIER, OF NEW YORK, N. Y.

LUBRICATING APPARATUS.

1,078,407.

Specification of Letters Patent.

Patented Nov. 11, 1913.

Application filed March 16, 1911. Serial No. 614,832.

*To all whom it may concern:*

Be it known that I, CHARLES S. BAVIER, a citizen of the United States, and a resident of the borough of Manhattan, in the county of New York and State of New York, have invented certain new and useful Improvements in Lubricating Apparatus, of which the following is a specification.

This invention relates to improvements in lubricating apparatus; and in particular it relates to improvements in that type of lubricating apparatus, wherein a terminal resistance valve is provided, so that the lubricant, being delivered by the resistance valve into the power generating medium as an impalpable spray, can not coalesce into drops before it is distributed over the said surfaces. When a lubricant is thus delivered and distributed, the maximum results of lubrication are attained with the minimum quantity of lubricant, and the evils arising from excessive use of lubricant are avoided.

The present invention is particularly applicable, as hereinbefore stated, to lubricating apparatus of the aforesaid type, and is adapted to be used with engines driven by air, steam, oil, gas or any other power generating medium.

The present invention also provides apparatus so constructed and arranged that various parts can be removed for cleaning, and various parts can be changed or repaired without permitting the power generating medium to escape, and scald or burn the workman.

It also provides means for filtering the lubricant and any substance which may be mixed therewith before the lubricant or mixture reaches the finer passages in the interior of the valve casing, thereby diminishing the liability of the clogging the valve.

The invention is also designed and constructed so that it will effectively deliver the minimum quantity of lubricant into the power generating medium, even drop by drop.

The invention is adapted to be used, either with a lubricant, such as oil alone, or with a mixture of lubricant, and a substance having a lower temperature of vaporization than the oil, and it is designed to raise the oil or the mixture to a very high temperature when desired, so as to discharge the lubricant into the power generating medium with a kind of explosive violence, which tears the particles of lubricant into fine spray as they enter the power generating medium.

Other advantages of the invention will be apparent from the description and claim hereinafter contained.

Referring to the drawings which accompany the specification to aid the description, Figure 1 is an elevation of the apparatus. Fig. 2 is a longitudinal section, in closed position, with certain parts in elevation, through the axis of the casing, on a larger scale. Fig. 3 is a cross section on the plane of the line 3—3 of Fig. 2, but showing certain parts in elevation. Fig. 4 is a cross section on the plane of the line 4—4 of Fig. 2.

For clearness and conciseness of description, I shall hereinafter designate the outer shell including the parts A, B, C, and their accessories collectively as the casing, and the parts D, E, F and their accessories collectively as the valve, sometimes also referring to the part D as the valve proper. Said casing, of any suitable material, comprises the nozzle A, preferably provided with an extension *a* adapted to project well into the chamber containing the power generating medium, and which chamber may be a steam cylinder, the cylinder of an oil or other engine, the valve chest thereof, or the steam pipe or other conduit conveying the power generating medium to the engine; and the part lettered G in Fig. 1, indicates diagrammatically a wall of the chamber into which the lubricant is delivered. Said nozzle A is threaded to engage threads on said wall, the joint being made tight in any suitable manner. Said extension *a* is provided with an outlet *b* for lubricant, preferably arranged to discharge directly into said power generating medium, so that the lubricant spray can not coalesce again into drops, but is swept along by the said medium and deposited on the surfaces to be lubricated as an impalpable spray. The bonnet B threads into the nozzle A, and is provided with one or more inlets as *d*, *e*, for connection with pipes, as *f*, *g*, supplying lubricant and a substance having a lower vaporizing temperature, or a mixture of them. As the apparatus is also intended to be used with lubricant alone, either of the said inlets *d* or *e*, may be plugged in the usual manner when not used as an inlet. Also threaded into nozzle A, within said bonnet B, is the ported sleeve C, and in the annular space between said bonnet and said sleeve is the filter H consisting preferably of a hollow metal cylinder with one end closed and perforated peripheral wall. For convenience of construction, I prefer to place in said nozzle A, a cylindrical lining *j*, securely held by having its flaring end *k* clamped between the conical end of said sleeve C and conical shoulder on the inside of said nozzle A, said lining being of such internal diameter as to provide only a small annular space around the valve stem E; said construction forming, when desired, a very effective heating chamber. Said valve preferably comprises the head, or valve proper D, the valve stem E, flanged sleeve F, and accessories to be hereinafter described. Said head D is a slide valve opening outwardly preferably cylindrical, working with oil tight fit in said nozzle A, and seating on the end of said lining *j* preferably at the inner edge of the outlet *b* which is preferably of circular form. Thus, as said valve begins to open, the inter-section of the inner face of head D with the peripheral arc of said outlet *b* forms a most minute opening, thereby providing for the effective discharge of the most minute quantity of lubricant, even a single drop. Said valve is located sufficiently near the chamber to which the lubricant is to be supplied, so that said lubricant shall not coalesce into drops after discharging from said valve. Said valve stem E is provided with the flanged sleeve F, which works with oil-tight fit in said sleeve C, a spring *o* normally tending to hold the valve proper closed. The outer end of sleeve F is preferably of somewhat greater diameter than the inner end of said sleeve, and greater than the diameter of said head D, and said lining *j* is practically of the same internal diameter as said sleeve C. Said pipe *f*, *g*, one or both, will be connected with suitable source or sources of supply, and with a suitable pump, or forcing apparatus, not shown, to force the lubricant or mixture into the valve casing under pressure sufficient to open the valve proper when necessary.

The operation is as follows: If lubricant alone is used, as oil, usually mixed with much air, the inlet *e* will be closed by any suitable plug in the ordinary manner. Then the pump will force the lubricant and air into the chamber B, and the lubricant and air will filter through filter H, and by the ports in sleeve C into the interior of said sleeve and into the annular space between lining *j* and valve stem E. When the pressure on the valve becomes sufficient valve proper D will open, the lubricant and any air mixed with it flying through the minute opening formed as said valve proper opens, as a finely atomized spray, and entering the power generating medium in that form, before it can again coalesce into drops, and being distributed by said medium over all the surfaces to be lubricated.

If a substance having a lower temperature of vaporization than the lubricant is to be mixed therewith, the mixing may be performed before the lubricant enters the valve casing, or it may be performed within said casing. In the latter case, both inlets *d* and *e* will be connected with pipes connecting respectively with a source of supply of lubricant and of other substance, and with a pump or forcing device, and the mixture will then take place within said chamber B, the filtration and the admission of the mixture within the lining *j* occurring as hereinbefore explained. But there is only a thin film of the mixture in the annular space within said lining *j*, and this film is quickly raised to a high temperature, with corresponding high pressure, by the heated nozzle *a*, which is heated by the hot power generating medium, and now, when the valve proper opens, the said substance, as it were, exploding, tears the particles of lubricant asunder as they enter the power generating medium, and converts them into an impalpable mist, which is delivered by said medium to the surfaces to be lubricated.

It will be seen from the foregoing description that the bonnet B, and filter H, and even the sleeve C, can be removed for cleaning, etc., without any danger of the escape of the hot power generating medium, or of burning or scalding the workman.

It will be understood that while the invention is especially adapted to be used with highly heated power generating mediums, such as steam or hot explosive gases, it is not limited thereto, but may also be employed to lubricate compressed air and other motors using power generating mediums at ordinary temperature. The breaking up of the lubricant into fine spray is facilitated by the sharp edges at the end of sleeve *j*, and at the inner face of the valve proper D.

Now having described my improvements, I claim as my invention:

In a lubricating valve, the combination of a casing, a resistance valve therein, a valve stem E thereof, a lining $j$ in said casing around said valve stem and adapted to form a constricted passage for lubricant, a ported sleeve C communicating with said lining $j$, and a filter H adapted to filter the lubricant before it enters said ported sleeve C, substantially as described.

Signed at New York city in the county of New York and State of New York this 14" day of March, A. D. 1911.

CHARLES S. BAVIER.

Witnesses:
EMANUEL WEIL,
S. J. GENSLER.